Figure 1:
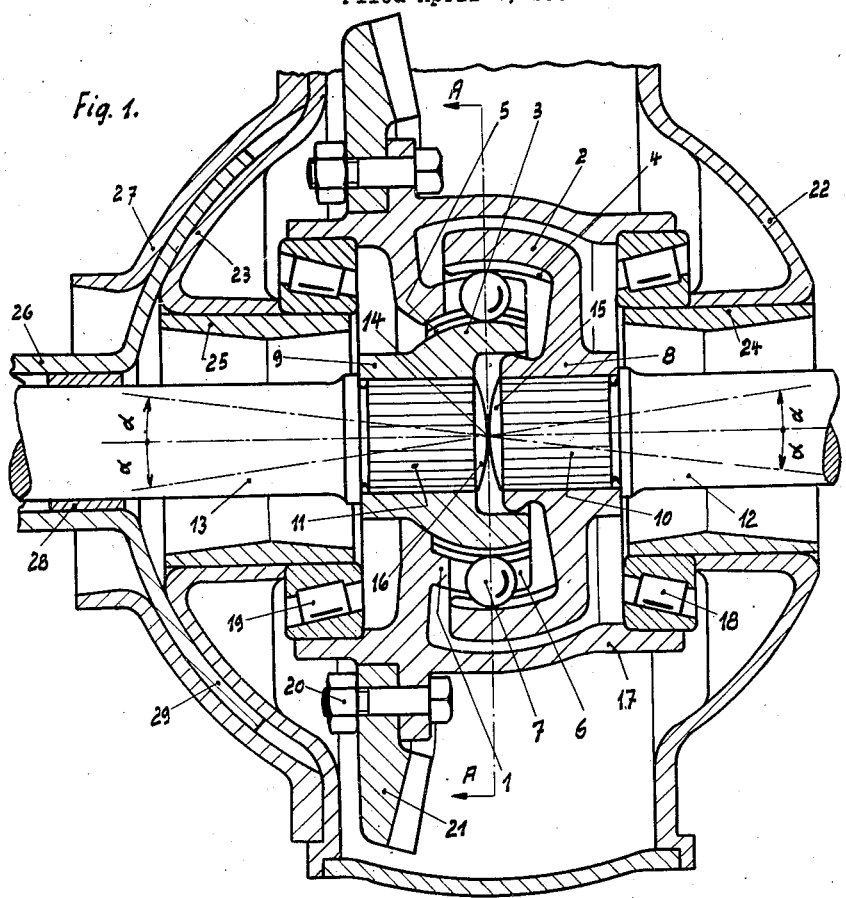

Feb. 6, 1934.   F. PORSCHE ET AL   1,946,358
ARTICULATED DIFFERENTIAL GEAR, PARTICULARLY FOR MOTOR VEHICLES
Filed April 5, 1933

Inventors:
F. Porsche
Karl Rabe

Patented Feb. 6, 1934

1,946,358

UNITED STATES PATENT OFFICE 1,946,358

ARTICULATED DIFFERENTIAL GEAR, PARTICULARLY FOR MOTOR VEHICLES

Ferdinand Porsche and Karl Rabe, Stuttgart, Germany

Application April 5, 1933, Serial No. 664,573, and in Germany April 8, 1932

6 Claims. (Cl. 74—7)

The invention relates to a differential gear particularly for motor vehicles with swinging half-axles, of the kind in which balls arranged in a cage of the driving member are supported between two rings arranged one within the other provided with engaging surfaces for the balls and each connected with a driven half-axle.

Differential gears are known in which rollers contained in a cage of the driving member are arranged between two rings of ring-shaped flanges located one within the other and provided with engaging surfaces for the rollers, which rings are connected each with one of the driven half-axles. These gears have the defect that the rings located one within the other with which the rollers engage, must be rigidly supported relatively to one another. The use of these gears, in so far as they serve for driving the wheels of motor vehicles, is on this account limited only to rigid back-axles.

The novel feature of the invention consists in the fact that the contact or engaging surfaces for the balls upon the rings are formed as spherical surfaces. Hereby the result is obtained that, without disturbing the engagement of the balls, the driven half-axles connected with the rings can be swung relatively to one another. The manner of operation of the gear remains uninfluenced by the position for the time being of the driven half-axles relatively to the driving member. On this ground the gear can be used for the drive of the wheels of motor vehicles journalled upon swinging half-axles. By comparison with the heretofore used differential gears with toothed wheels and two universal joints this drive is of a simplicity and inexpensiveness not to be surpassed.

A further feature of the invention consists in the fact that the ball-cage connected with the driving member is formed essentially as a spherical ring and the centre of the spherical ring is arranged in the centre of the differential gear. Hereby the result is obtained that the spherical ring-shaped cage can be passed closely on to the spherical ring-shaped engaging surfaces of the rings. The construction of the gear can therefore be extraordinarily compact and space-saving without reducing the feasibility of the driven half-axles swinging.

Further features of the invention are directed to the centring the rings or of the half-axles relatively to the axle-housing also to the support of the driving member in the axle-housing, and have for their purpose to transmit the reaction-forces of the drive in an unobjectionable manner to the axle-housing and to ensure a good engagement and finish of all parts of the gear.

Figure 2:
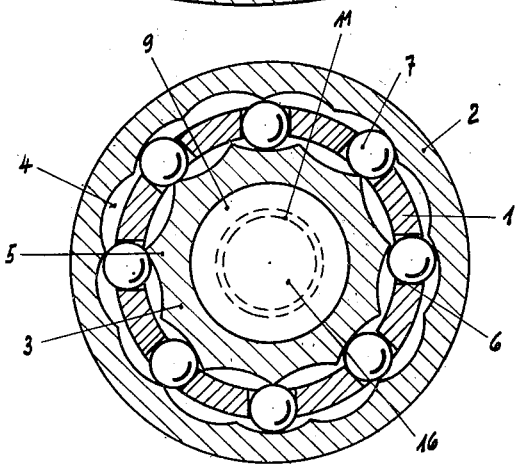

The subject-matter of the invention is illustrated in the accompanying drawing in a constructional example as a differential gear for a motor vehicle with driven swinging half-axles, in which drawing Fig. 1 is a vertical section through the gear transversely to the longitudinal axis of the vehicle, and Fig. 2 is a corresponding section on the line A—A in Fig. 1.

Referring to the drawing, the ball-cage 1 consists of a spherical ring the centre of which coincides with the centre 14 of the gear. The cage 1 is provided with slots 6 in which are located eight balls 7. The balls 7 are guided in the radial direction by the slots 6 and have considerable play in these slots 6 in the axial direction. At the same time the balls 7 remain in engagement with two spherical rings 2, 3, the centres of which likewise coincide with the centre 14 of the gear. The rings 2, 3 and the cage 1 are supported concentrically within one another. The outer ring 2 arranged outside the cage 1 is connected with the half-axle 12, and the inner ring 3 arranged within the cage 1 is connected with the half-axle 13. The outer ring 2 is provided with thirteen cam-like engaging surfaces 4 on its inner periphery for the balls 7. The inner ring 3 is provided with eleven cam-like engaging surfaces 5 on its outer periphery for the balls 7. These engaging surfaces 4, 5 are so formed in the radial direction that the balls 7 carry the rings 2, 3 mechanically with them in every reciprocal position. In the axial direction the engaging surfaces 4, 5 are formed like spherical rings and are passed closely upon the outer or inner periphery of the cage 1.

The rings 2, 3 can be turned relatively to one another about the centre 14 of the gear without their engaging surfaces 4, 5 coming in contact with the cage 1. The maximum deflection of the rings 2, 3 is given by the angle of swing α of the half-axles connected with them. The balls 7 can roll along the spherical engaging surfaces 4, 5 without changing the character of their engagement which is necessary for the transmission of power. The balls 7 are driven in the tangential direction by the cage 1. Their radial position for the time being is determined by the reciprocal position of the engaging surfaces 4, 5. Hence the balls 7 only have play in the axial direction. This play is necessary in order that the balls 7 may of themselves seek their bearing points along the engaging surfaces 4, 5 to avoid jams due to unavoidable small inaccuracies in machining the engaging surfaces 4, 5. The balls 7 can roll in every direction during the drive. Their contact points with the engaging surfaces 4, 5 and with the cage 1 therefore change continually in operation, so that local excessive stresses which might lead to a premature wearing away of the balls 7 are excluded.

The ball-cage 1 is connected with a bearing member 17 to which the bevel pinion 21 transmitting the drive is fixed by means of screw bolts 20. The bearing member 17 is rotatably supported on both sides of the rings 2, 3 in conical roller bearings 18, 19. The distance of these bearings 18, 19 from the centre of the gear is selected in such a manner that the rings 2, 3 can be swung through the necessary angle. The bearings 18, 19 rest upon carrier rings 24, 25 which are supported in bearing-like recesses of the housing-flanges 22, 23. The interior diameter of the carrier rings 24, 25 is dimensioned in such a manner that the half-axles 12, 13 which are passed through the carrier rings 24, 25 have the necessary power of swinging through the angle α. This formation of the carrier rings 24, 25 renders it possible to locate the bearings 18, 19 for the bearing member 17 very far into the interior of the gear without rendering difficult the assembling dismantling of the separate parts of the gear.

The rings 2, 3 are provided with hubs 8, 9 which are mounted upon the fluted ends 10, 11 of the half-axles 12, 13. The hubs 8, 9 are guided one against the other for the purpose of directly equalizing the forces exerted by the balls 7 upon the rings 2, 3. The inner end of the hub 8 makes contact with the inner periphery of the ring 3. The contact surfaces are so formed that the necessary power of the rings 2, 3 swinging relatively to one another remains unaffected. The front surfaces 15, 16 of the half-axles 12, 13 are spherically formed and in contact at the centre 14 of the gear. This contact at the centre 14 is also maintained when the half-axles 12, 13 are swung relatively to one another. The half-axle 13 is rotatably supported in the axle tube 26 by means of the box 28. The inner end of the axle tube 26 is widened to form a spherical seating 29 which is guided between the housing flange 23 and the housing cover 27. This guiding of the axle tube 26 in combination with the contacting surfaces 15, 16 establishes the axial centring of the half-axles 12, 13 and ensures the possibility of their swinging about the centre 14 of the gear.

The manner in which the gear operates may be assumed as known. As the transmission of power from the cage 1 to the rings 2, 3 during the differential action is effected by great pushing forces which are produced by the balls 7 upon the engaging surfaces 4, 5 the internal friction of the gear increases considerably in this condition of operation. The advantage however is involved therewith that the gear is self-stopping, that is, even with the complete unloading of the one half-axle the drive of the other half-axle is always possible. In contra-distinction to the usual differential gears with toothed wheels, with this gear there is no fear of racing.

The subject matter of the invention is not limited to the one constructional example. The centring of the half-axles 12, 13 can also be effected by guiding the ring 3 on its outer periphery in a spherical surface of the bearing member 17 and at the same time guiding the ring 3 on its outer periphery by means of the engaging surfaces 5 in the spherical surface of the cage 1. The outer ends of the hubs 8, 9 can be formed spherical and be guided in lateral walls or covers of the bearing member. By the hubs 8, 9 formed in this manner the bearing member 17 can be closed oil-tight. In this case the bearing member 17 can be filled with oil or grease, whereby the automatic and continuous lubrication of the whole of the parts of the gear under stress is taken care of. The balls 7 can be replaced by roller bodies similar to balls, for example, by such a roll only in the axial direction but on the contrary can slide in the radial direction. Finally the features of the invention can also be used upon gears with which the rings 2, 3 are arranged not within one another but alongside of one another.

With all such constructions the articulation and differential gear are so combined with one another that the action of the one without the action of the other is inconceivable. The designation "articulated differential gear" must therefore indicate not the combination of two things known per se but something fundamentally new.

Having now particularly described and ascertained the nature of our said invention and in what manner the same is to be performed, we declare that what we claim is:—

1. An articulated differential gear, particularly for motor vehicles with swinging half-axles, comprising a driving member having a cage and a plurality of balls associated therewith; and a ring on the inner end of each half axle, and each having engaging or contacting surfaces for the balls and the rings being provided on the sides of the cage and balls so that the latter are between the rings, the rings being formed as part spherical rings so that the surfaces contacting with the balls present spherical surfaces to permit swinging motions of the half axles relative to each other.

2. An articulated differential gear according to claim 1, in which the ball cage is formed essentially as a spherical ring and the centre of the spherical ring is arranged in the centre of the differential gear.

3. An articulated differential gear according to claim 1, in which the cage is provided with slots and the balls have axial play in the slots.

4. An articulated differential gear according to claim 1, in which the half axles are spherically formed on their inner ends and abut against each other in the centre of the differential gear.

5. An articulated differential gear according to claim 1, in which the ball cage is connected with a bearing member and in which a roller bearing is provided on each side of the rings for the bearing member.

6. An articulated differential gear according to claim 1, in which the ball cage is connected with a bearing member and in which a roller bearing is provided on each side of the rings for the bearing member; and a carrier ring is provided for each ball bearing to support the driving member, the bearing members, and the ball bearings.

FERDINAND PORSCHE.
KARL RABE.